US012314422B2

(12) United States Patent
Jayaprakash et al.

(10) Patent No.: US 12,314,422 B2
(45) Date of Patent: May 27, 2025

(54) AUTOMATIC APPLICATION DATA COLLECTION FOR POTENTIALLY INSIGHTFUL BUSINESS VALUES

(71) Applicant: Cisco Technology, Inc., San Jose, CA (US)

(72) Inventors: Ashwin Jayaprakash, Sunnyvale, CA (US); Juhwan Jeong, San Fancisco, CA (US); Ryan Nicholas TerBush, Laguna Hill, CA (US); Vinay Srinivasaiah, San Carlos, CA (US); Puneet Anand, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 785 days.

(21) Appl. No.: 16/690,358

(22) Filed: Nov. 21, 2019

(65) Prior Publication Data

US 2020/0394329 A1    Dec. 17, 2020

Related U.S. Application Data

(60) Provisional application No. 62/862,045, filed on Jun. 15, 2019.

(51) Int. Cl.
*G06F 21/62* (2013.01)
*G06F 11/30* (2006.01)
*G06F 11/34* (2006.01)

(52) U.S. Cl.
CPC ........ *G06F 21/6245* (2013.01); *G06F 11/302* (2013.01); *G06F 11/3466* (2013.01)

(58) Field of Classification Search
None
See application file for complete search history.

(56) References Cited

U.S. PATENT DOCUMENTS

| | | | | |
|---|---|---|---|---|
| 6,467,052 | B1 * | 10/2002 | Kaler | G06F 11/3096 714/E11.181 |
| 7,617,484 | B1 * | 11/2009 | Fienblit | G06F 11/3676 717/124 |

(Continued)

OTHER PUBLICATIONS

J. K. Hollingsworth, B. P. Miller and J. Cargille, "Dynamic program instrumentation for scalable performance tools," Proceedings of IEEE Scalable High Performance Computing Conference, Knoxville, TN, USA, 1994, pp. 841-850. (Year: 1994).*

(Continued)

*Primary Examiner* — Andrew M. Lyons
(74) *Attorney, Agent, or Firm* — BEHMKE INNOVATION GROUP LLC; James M. Behmke; James J. Wong

(57) ABSTRACT

In one embodiment, a method for automatic application data collection is disclosed. The method illustratively comprises determining a stack trace associated with one or more business transactions, wherein at least one application is configured to perform at least part of the one or more business transactions; identifying, based on the stack trace, one or more methods of the at least one application that were invoked during performance of the one or more business transactions; selecting, from the identified one or more methods, a set of the one or more methods by applying at least one scoring heuristic to the identified one or methods; and configuring one or more monitoring agents executing on the at least one application to instrument the selected set of the one or methods at one or more instrumentation points, wherein application performance data is generated by instrumentation of the one or more instrumentation points.

20 Claims, 11 Drawing Sheets

(56) References Cited

U.S. PATENT DOCUMENTS

| | | | |
|---|---|---|---|
| 8,606,877 B2 | 12/2013 | Lind et al. | |
| 8,656,006 B2* | 2/2014 | Cobb | H04L 41/5083 709/224 |
| 8,838,534 B2 | 9/2014 | Fowler | |
| 9,021,448 B1* | 4/2015 | Gagliardi | G06F 8/70 717/133 |
| 9,027,011 B1* | 5/2015 | Lam | G06F 11/3409 718/1 |
| 9,064,041 B1* | 6/2015 | Cirne | G06F 11/3466 |
| 9,626,675 B2 | 4/2017 | Desai et al. | |
| 10,198,340 B2* | 2/2019 | Vesepogu | G06F 11/3466 |
| 2003/0110313 A1* | 6/2003 | Dochez | G06F 11/3676 714/E11.208 |
| 2004/0010785 A1* | 1/2004 | Chauvel | G06F 11/3419 717/148 |
| 2004/0163077 A1* | 8/2004 | Dimpsey | G06F 11/3466 717/130 |
| 2005/0091645 A1* | 4/2005 | Chilimbi | G06F 11/366 717/130 |
| 2006/0150162 A1* | 7/2006 | Mongkolsmai | G06F 11/3612 717/131 |
| 2007/0169003 A1* | 7/2007 | Branda | G06F 11/3409 717/130 |
| 2008/0141335 A1* | 6/2008 | Thomas | G06F 21/125 726/1 |
| 2008/0301636 A1* | 12/2008 | Khan | G06F 8/316 717/118 |
| 2010/0115495 A1* | 5/2010 | Sunkara | G06F 11/3636 717/130 |
| 2010/0180159 A1* | 7/2010 | Bittles | G06F 11/3636 714/45 |
| 2011/0283263 A1* | 11/2011 | Gagliardi | G06F 11/3612 717/130 |
| 2012/0173490 A1 | 7/2012 | Gould et al. | |
| 2012/0304172 A1* | 11/2012 | Greifeneder | G06F 11/3419 718/1 |
| 2013/0198572 A1* | 8/2013 | Han | G06F 11/3636 714/E11.2 |
| 2013/0263096 A1* | 10/2013 | Hulick | G06F 11/321 717/130 |
| 2014/0165029 A1* | 6/2014 | Balasubramanian | G06F 11/3466 717/110 |
| 2014/0189438 A1* | 7/2014 | Arbel | G06F 21/556 714/47.1 |
| 2016/0062868 A1* | 3/2016 | Mani | G06F 11/3466 717/130 |
| 2016/0274991 A1* | 9/2016 | Christodorescu | G06F 8/443 |
| 2016/0323362 A1* | 11/2016 | Srinivasaiah | G06F 11/301 |
| 2016/0378615 A1* | 12/2016 | Cohen | G06F 11/3055 714/19 |
| 2017/0249235 A1* | 8/2017 | Staples | G06F 11/3688 |
| 2017/0286253 A1* | 10/2017 | Che | G06F 11/3636 |
| 2018/0032905 A1* | 2/2018 | Abercrombie | G06F 11/3006 |
| 2018/0060217 A1* | 3/2018 | Yemini | G06F 11/3471 |
| 2018/0121325 A1* | 5/2018 | TerBush | G06F 11/3644 |
| 2018/0121329 A1 | 5/2018 | Lo et al. | |
| 2018/0285238 A1* | 10/2018 | Somesula | G06F 9/45504 |
| 2018/0373612 A1* | 12/2018 | West | G06F 11/3423 |
| 2019/0197147 A1* | 6/2019 | He | G06F 8/70 |
| 2019/0273753 A1* | 9/2019 | Shirley | H04L 63/1416 |
| 2019/0317885 A1* | 10/2019 | Heinecke | G06F 11/3616 |

OTHER PUBLICATIONS

A. Wert, H. Schulz and C. Heger, "AIM: Adaptable Instrumentation and Monitoring for Automated Software Performance Analysis," 2015 IEEE/ACM 10th International Workshop on Automation of Software Test, Florence, Italy, 2015, pp. 38-42. (Year: 2015).*

* cited by examiner

⎫ 700

Visit method definition ('this-method') in *all* the captured stacktraces ('stack-trace-elements')
'if(method-scores[this-method] == nil) method-scores[this-method] = 0'

⎱ 702

If a method has already been examined, then we can skip this step
If a class is filtered using call graph *filter* configuration, then we can skip this step Visit class definition of return *type* and every parameter *type* of 'this-method'
  If a class is filtered using call graph *filter* configuration, skip this step
  If *type* is 'interesting'
    'method-scores[this-method]++'
  Else if "complex type", visit it
    For each field in "complex type"  // Includes the superclass fields
      If *type* of field is 'interesting'
        If it has corresponding getter method (in the same declaring class as field)
          'method-scores[this-method]+=5'  // We highly favor this design
        Else
          'method-scores[this-method]+=2'  // This is still a field.
      For each return *type* of 'public getXXX()' method and 'public' field in "complex type"
        If *type* is 'interesting'
          'method-scores[this-method]++'
    Else if array or collection or '*Object*'
      Do nothing

⎱ 704

If 'this-method' has *any* runtime annotation
  'method-scores[this-method]++'

⎱ 706

Sort *all* the methods based on their scores ('method-scores')
Pick the top X methods
Instrument those methods and their parameters and return types

AUTOMATIC APPLICATION DATA COLLECTION FOR POTENTIALLY INSIGHTFUL BUSINESS VALUES

RELATED APPLICATION

This application claims priority to U.S. Provisional Appl. Ser. No. 62/862,045, filed on Jun. 15, 2019, entitled "AUTOMATIC APPLICATION DATA COLLECTION FOR POTENTIALLY INSIGHTFUL BUSINESS VALUES", by Ashwin Jayaprakash, et al., the contents of which are incorporated herein by reference.

TECHNICAL FIELD

The present disclosure relates generally to computer systems, and, more particularly, to automatic application data collection for potentially insightful business values.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, various Application Performance Monitoring (APM) environments exist today that allow for tracking of application metrics and tracing back certain performance issues, and so on. However, such APM programs are generally geared toward development teams that are aware of the intricacies of the data in terms of function and location (i.e., knowing how the code works). In other words, it can often be difficult for departments inside companies other than engineering or development (e.g., operations, business, marketing, etc.) to understand which parts of their applications (apps, programs, software, websites, etc.) and which classes, functions, and parameters contain values of interest to their business use cases. That is, there are many APM customers who do not have in-depth understanding and knowledge of the application and its overall architecture, but in order for APM analytics to provide valuable insights to these customers, it is necessary to know where and how data could be obtained from within an application, Since this is a problem in which only writers/maintenance of the source code know these instrumentation points, today this problem is solved by a long and convoluted process of the customer requesting a particular outcome from APM developers, the APM developers reaching out to the right departments (e.g., engineering) at the customer and then learning which set of class-method-parameter-name would contain a certain value of interest, and then programming the APM system to instrument these points. This process leads to a massive loss of productivity and adds delay in deploying value for customers.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7 illustrates automatic application data collection for potentially insightful business values at an example pseudo code level;

DESCRIPTION OF EXAMPLE EMBODIMENTS

Overview

Figure 1A:
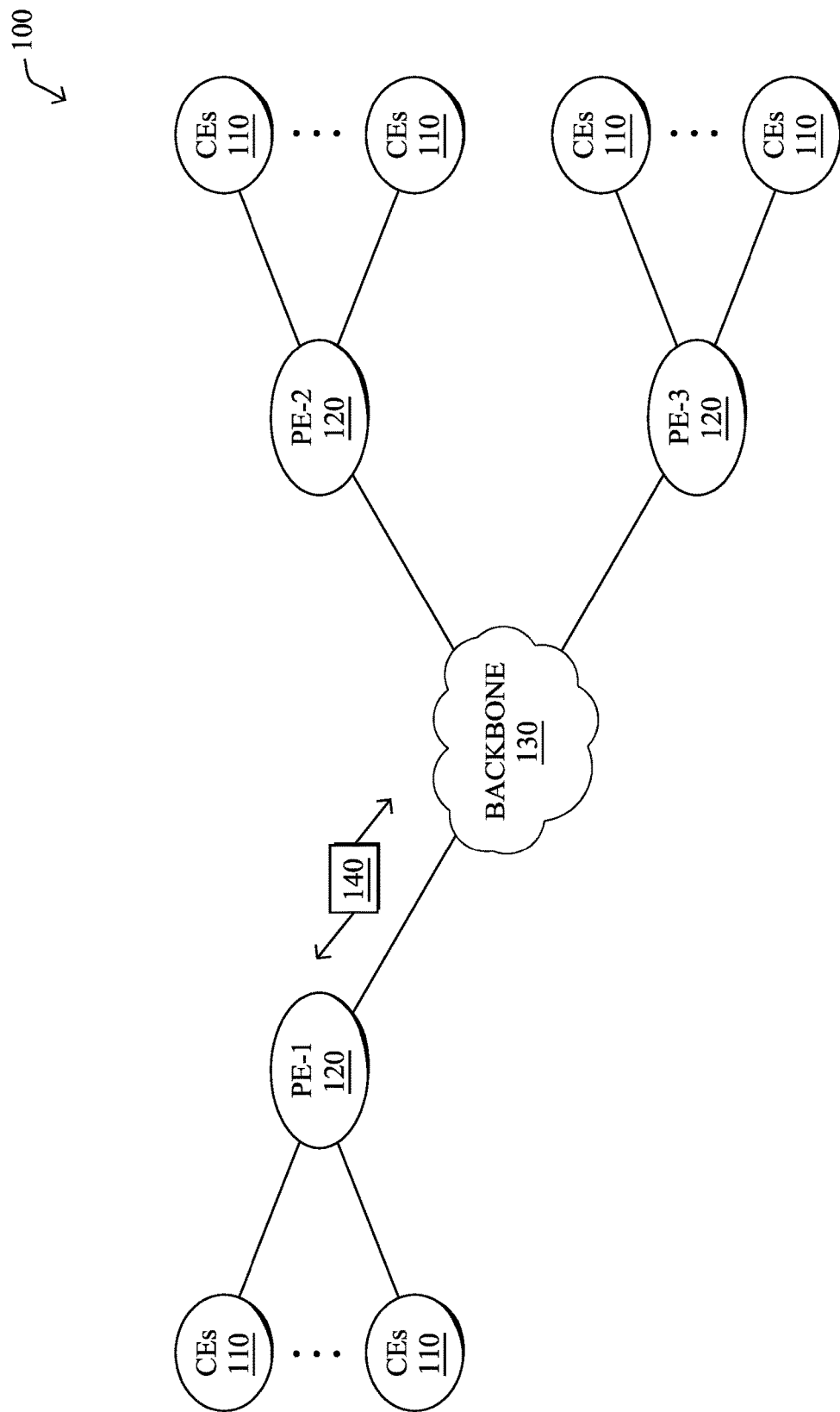
FIGS. 1A-1B illustrate an example computer network.

According to one or more embodiments of the disclosure, automatic application data collection for potentially insightful business values is shown and described. In particular, in one embodiment, a method illustratively comprises determining, by a process, a stack trace associated with one or more business transactions, wherein at least one application is configured to perform at least part of the one or more business transactions; identifying, based on the stack trace, one or more methods of the at least one application that were invoked during performance of the one or more business transactions; selecting, from the identified one or more methods, a set of the one or more methods by applying at least one scoring heuristic to the identified one or methods; and configuring one or more monitoring agents executing on the at least one application to instrument the selected set of the one or methods at one or more instrumentation points, wherein application performance data is generated by instrumentation of the one or more instrumentation points.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
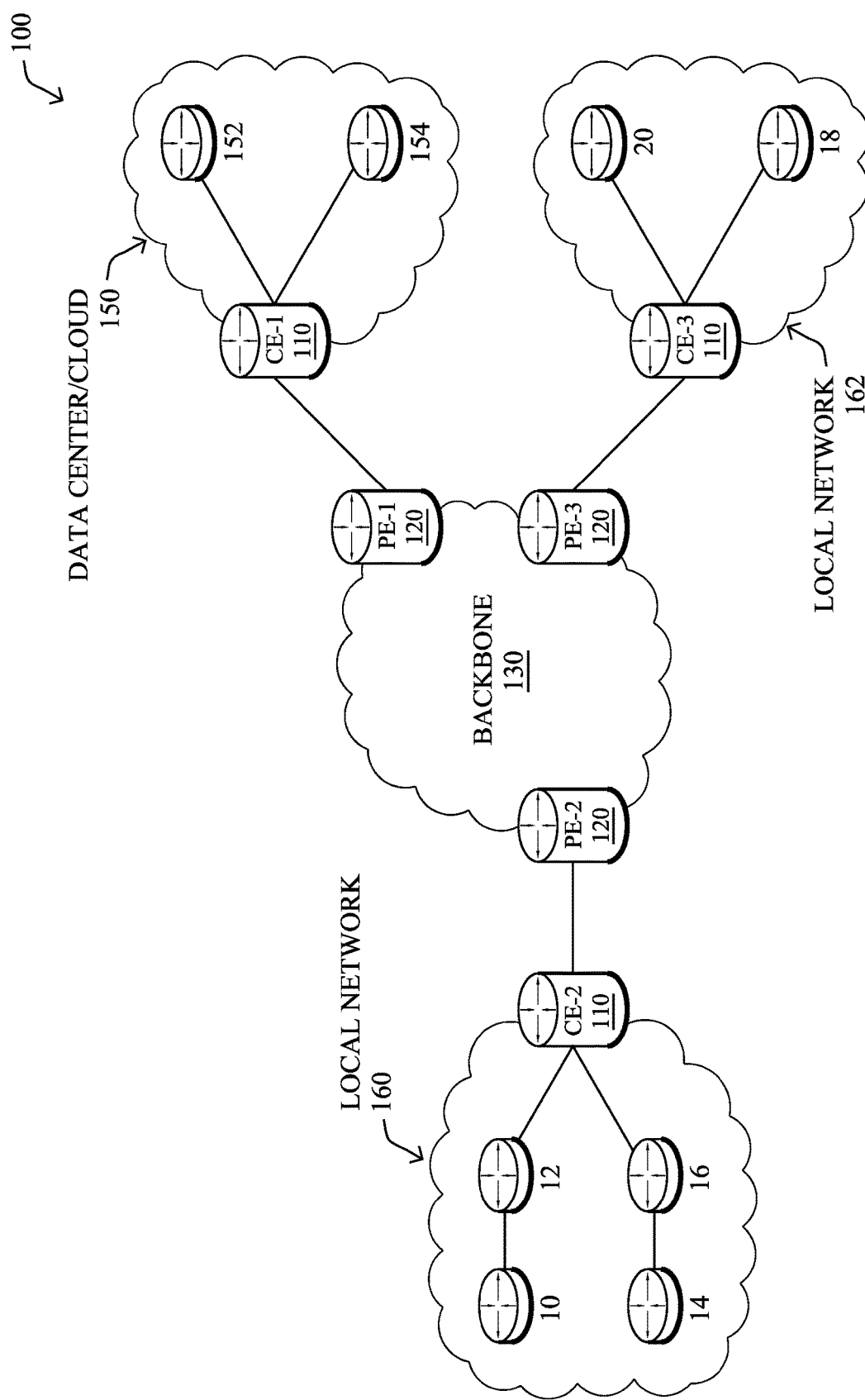

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
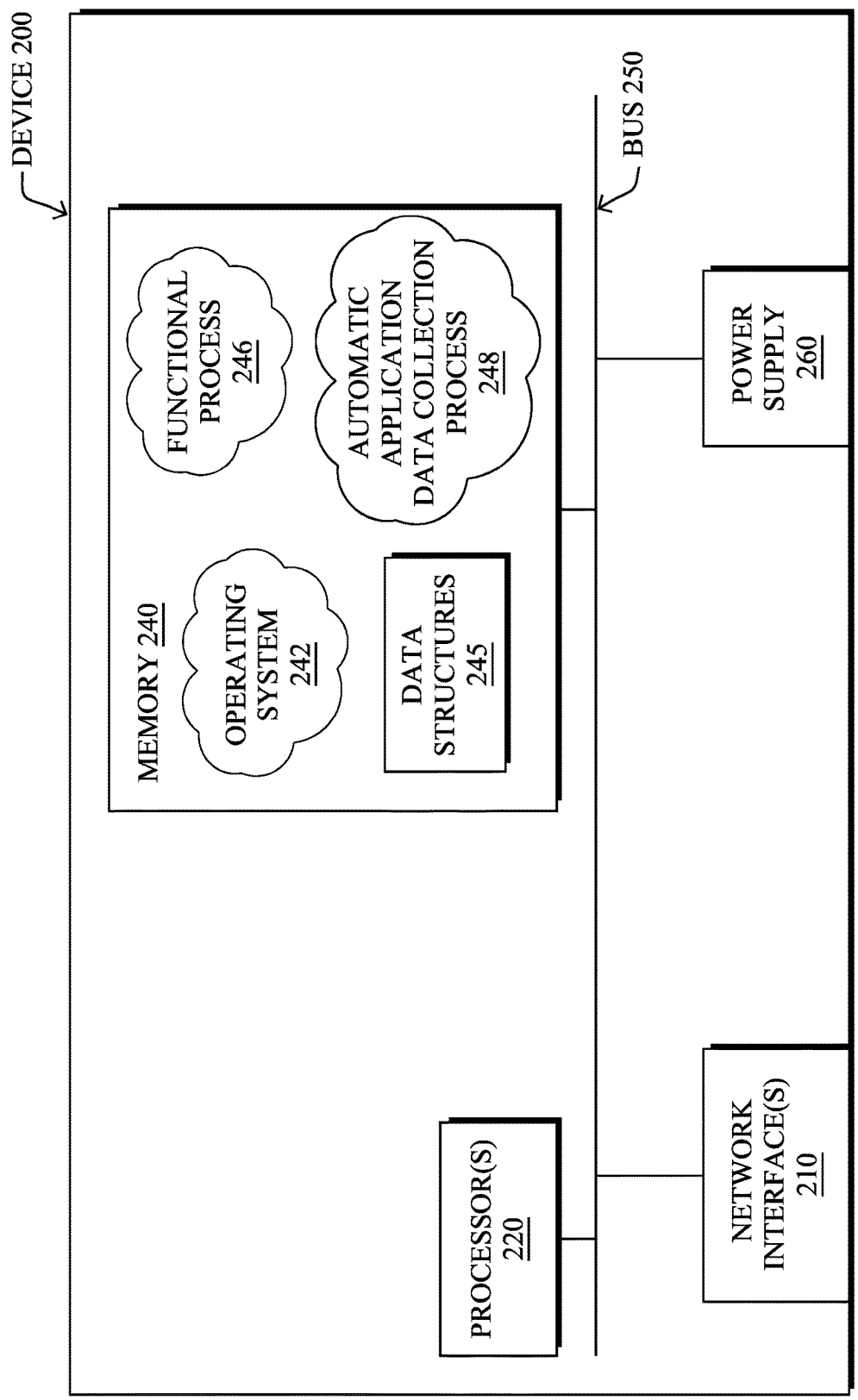
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "automatic application data collection" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Application Intelligence Platform——

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
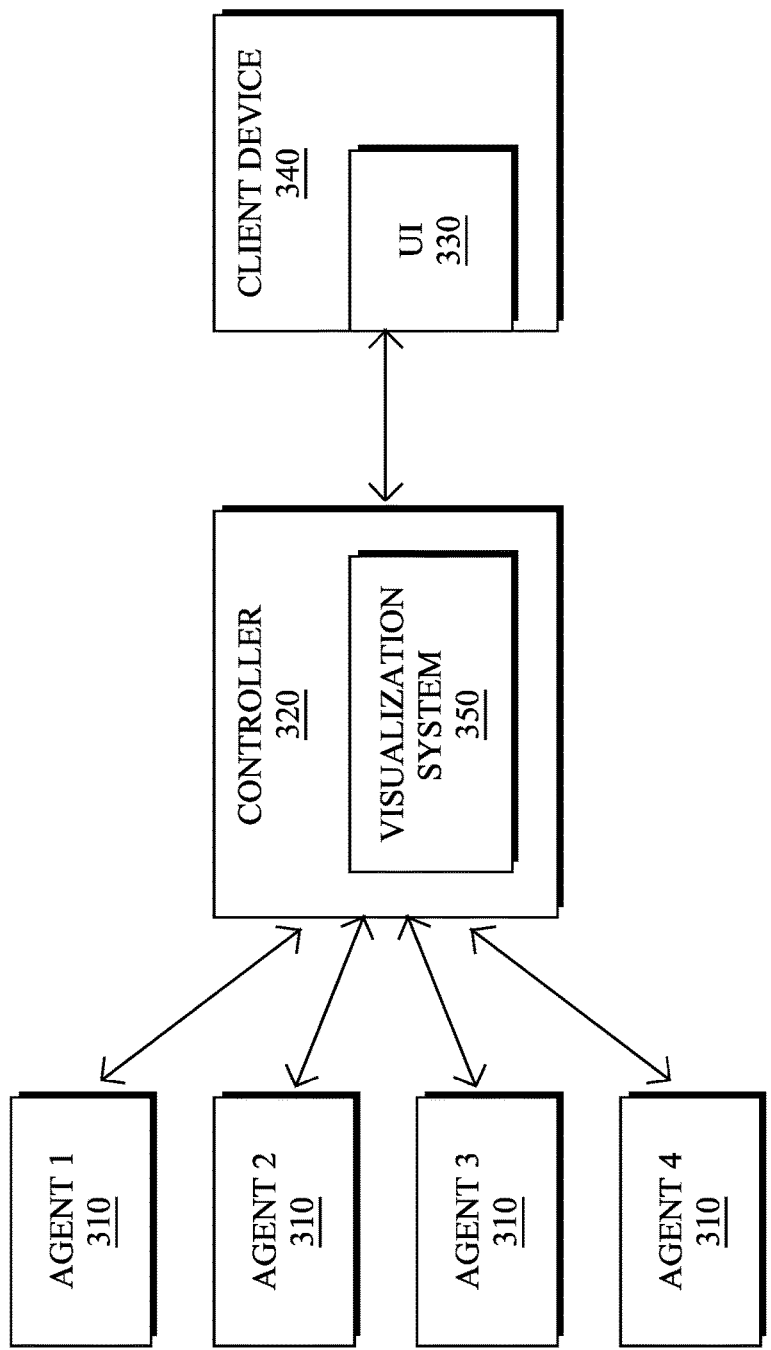
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premises (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stack trading application, particular real-world services can include operations such as receiving a stack quote, buying, or selling stacks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
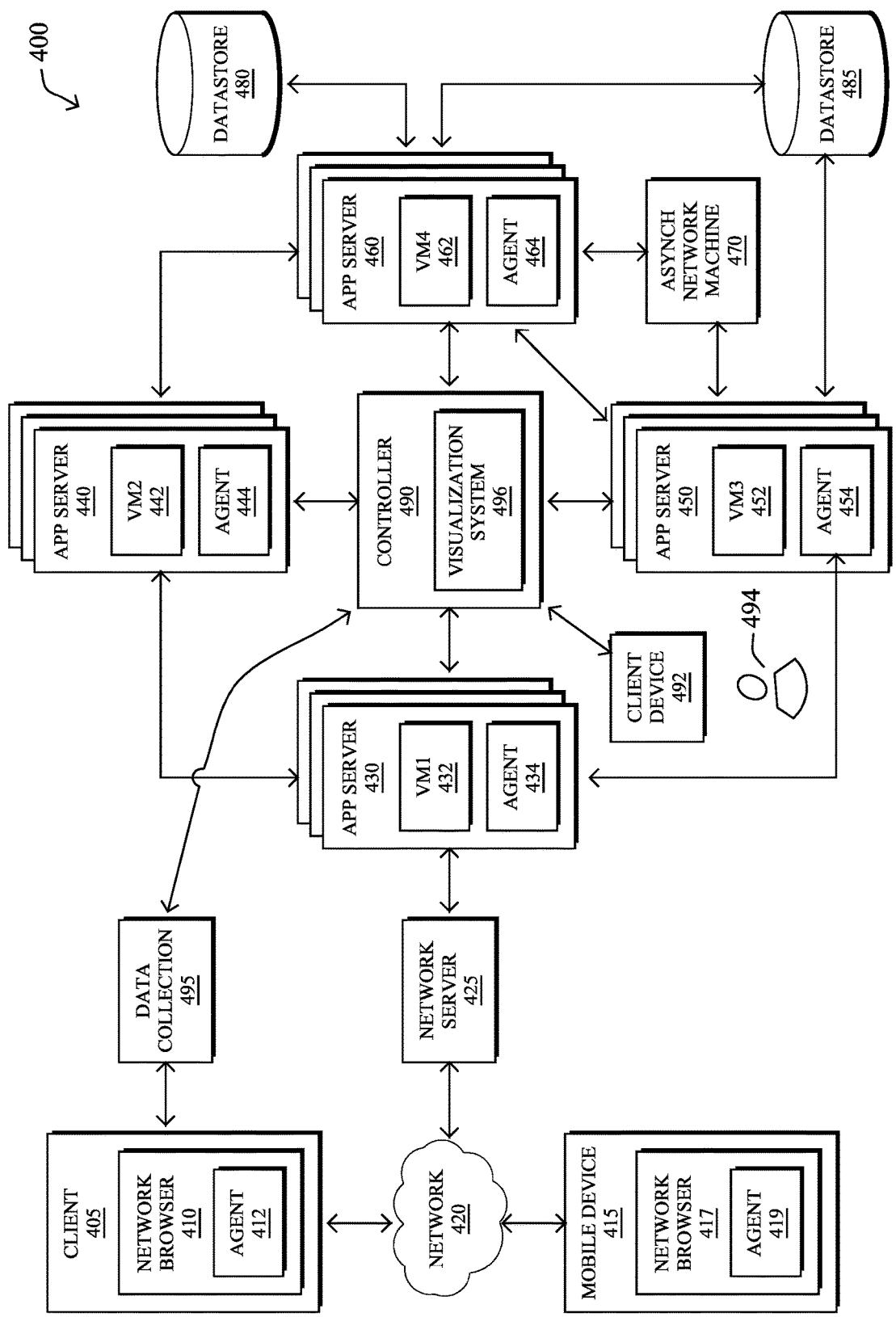
FIG. 4 illustrates an example system for implementing the example application intelligence platform.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 495, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may report data to data collection server 495 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 4). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier of nodes, or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agents may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent, which may be referred to as an infrastructure agent, may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 460. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 495. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 490 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
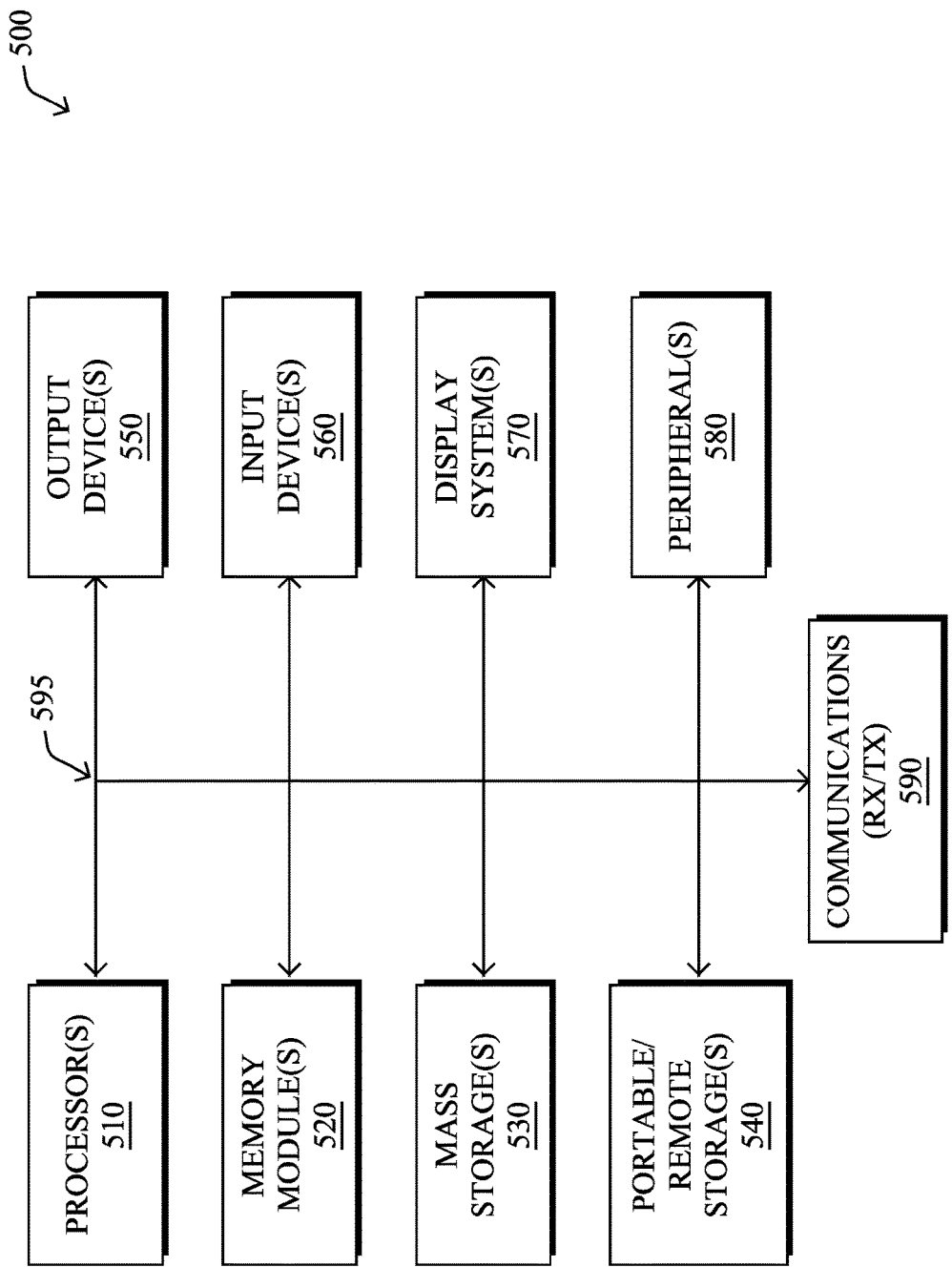
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, asynchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present disclosure for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present disclosure may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

——Automatic Application Data Collection——

In the context of server applications, an application intelligence platform as described above (or an application performance monitoring (APM) platform) may capture business transaction information that reflects (or is indicative of) the way end users of applications use those applications. The captured business transaction information provides operators of the applications end-to-end visibility into the performance of their applications. For example, the captured business transaction information may include information such as which node and/or tier a particular user request were monitored from as well as identities of nodes, tiers, or exit calls that were called as a result of the request. In this manner, an entire chain of code execution, including classes and methods called, may be captured as part of the business transaction (BT). In a more specific example, entry points are a first level where a business transaction may be monitored from, for example, a servlet or a web service on a first tier of the application. Conventionally, the application(s) monitored by the application intelligence platform are operated on and maintained separately from the application intelligence platform (i.e., one entity may "own" the application intelligence platform, while another entity "owns" the monitored applications and may be considered a customer of the entity who operates the application intelligence platform).

In addition to capturing business transaction information, an APM platform may include a data collector (which may from time-to-time be referenced as a Method Invocation Data Collector (MIDC) herein) that gathers data based on invocations of one or more methods within or part of an application. Generally, an MIDC may be configured to, given a class name, method name, and/or parameter names, capture data such as method arguments, variables, and return values. Because of the granularity and overall robustness of data that MIDCs may collect, configuring MIDCs (e.g., inserting them into an application) as well analyzing information output by MIDCs may be especially difficult. In particular, since operators of the application typically do not also operate the APM platform, it may be difficult for the operators of the application to find desired information (e.g., data) outside of what is provided by captured business transaction information that is within or generated by an application. In other words, the operators of the platform types may be familiar with what they want to know but are unable to access this information, given the separation of maintenance of the application and the APM platform. That is, identification of class, methods, and or parameter names of interest (or that would carry the most insightful data) is oftentimes challenging.

In an example, an entity (e.g., a company) that operates an application may typically comprise individuals that are not part of engineering and/or development groups that maintain the application. However, some of these individuals may still desire information that is associated with the application, for example, information related to certain data pieces flowing through systems of the application and when applications are being used in real-time by end users. Notably, this information may be used to monitor how the application is being used by end users, in the thousands or millions, of the application then correlated with performance issues that the APM platform may identify. Alternatively, this information may simply be used to identify and understand how parts of the application impact the entity.

Acquiring this information requires deep knowledge of the application, including exact classes, functions, parameter names, and data values from which to capture data from the application, which most individuals in the entity typically do not possess (nor do operators of the APM platforms). In particular, for non-technical individuals of the entity, they would likely need to identify members of an engineering and/or development groups that maintain the application and reach out to them, which can be incredibly difficult for a medium to large entity (e.g., corporation). Additionally, even for members of the engineering and/or development groups, identification and instrumentation of exact classes, functions, parameter names, and data values from which to capture data from the application can be very time-consuming (as members of the groups may change, testing may require that the application be "live," information may need to be revisited and confirmed, etc.)

In order to avoid having individuals within an entity that operates an application tinker around and lose days of productivity in identifying and instrumenting parts of the application, an operator of an APM platform may provide for automatic application data collection for potentially insightful business values. In particular, the techniques herein aim to provide, from an APM platform operator and to customers of the APM platform (e.g., entities that operate on application on which an APM platform is installed), an "out of the box" tool that facilitates visibility into automatically collected data points and corresponding instrumentation points in the application of the customer, thereby enabling the customer to easily capture data in their production environments. This tool may be configured as to provide privacy from the application operator perspective in that it may not be desirable to have the APM platform operator have visibility into the entirety of data of the customer's application. Using this data, the customer may then move on to analyzing the same data and use the data in aiding critical business decisions related to performance of their application. Currently, no solution exists that allows for the application operator (as compared to an APM platform operator), to review, in real-time, discovered data running through their application. As described in more detail below, using a stack trace generated from an application based on various heuristics, the techniques herein determine certain code areas or instrumentation points (detailed below) within an application of the customer that may be monitored to gain insightful perspectives into usage of the application. After determining the certain code areas or instrumentation points, the techniques herein may facilitate instrumentation of the certain code areas or instrumentation points, where the instrumentation enables monitoring, by the application operator, of portions of the application that correspond to potential importance and/or insightful impact.

Specifically, according to one or more embodiments described herein, a method illustratively comprises determining, by a process, a stack trace associated with one or more business transactions, wherein at least one application is configured to perform at least part of the one or more business transactions; identifying, based on the stack trace, one or more methods of the at least one application that were invoked during performance of the one or more business transactions; selecting, from the identified one or more methods, a set of the one or more methods by applying at least one scoring heuristic to the identified one or methods; and configuring one or more monitoring agents executing on the at least one application to instrument the selected set of the one or methods at one or more instrumentation points, wherein application performance data is generated by instrumentation of the one or more instrumentation points.

Figure 6:
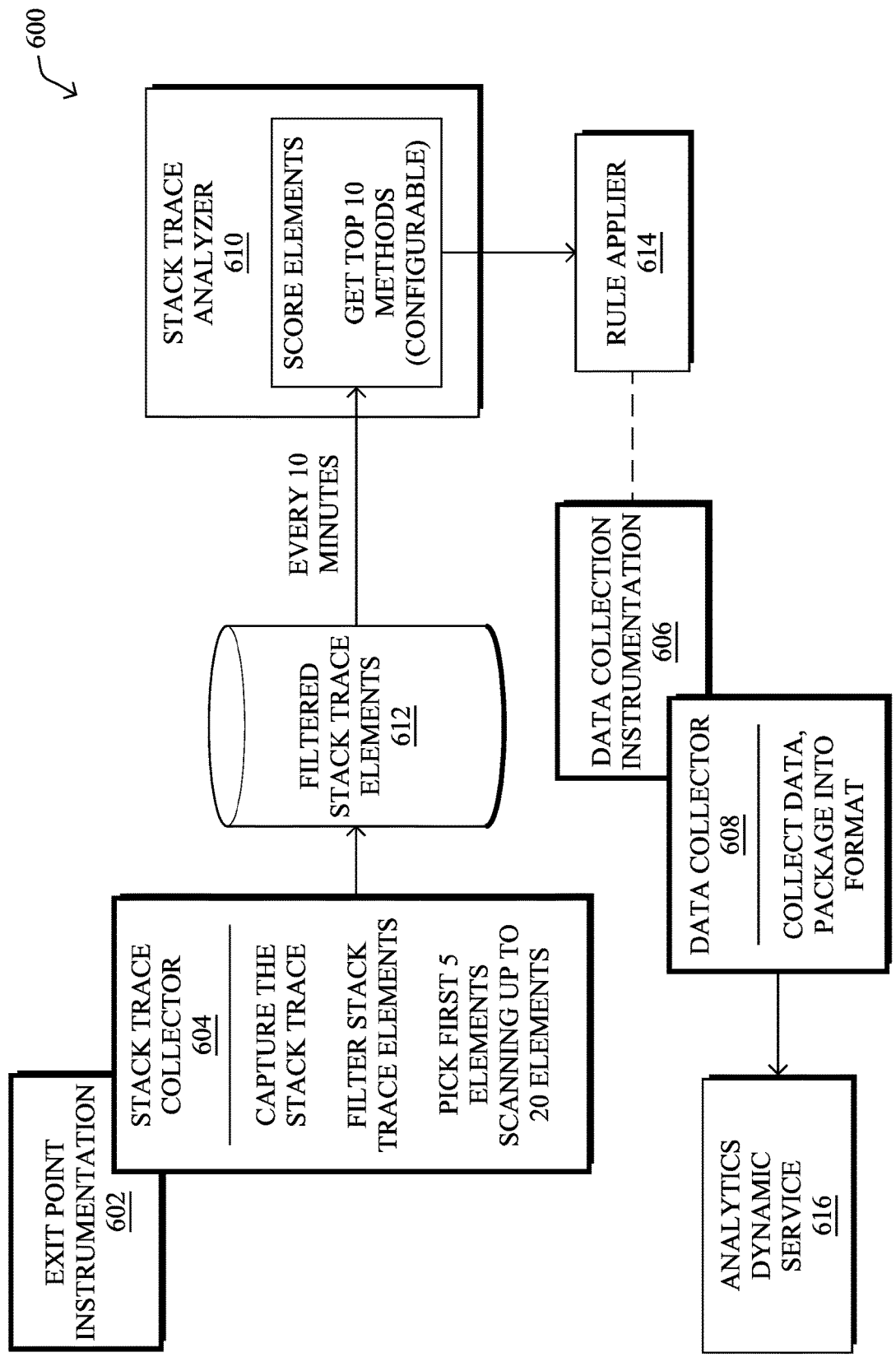
FIG. 6 illustrates an example system for automatic application data collection for potentially insightful business values.

Operationally, and with reference now to FIG. 6, an example system 600 for automatic application data collection for potentially insightful business values is shown. Notably the system may comprise exit point instrumentation 602, a stack trace collector 604, data collector instrumentation 606, and a data collector 608. Additionally, the system 600 may comprise a stack trace analyzer 610 which may be part of, for example, an APM platform. Each of the exit point instrumentation 602, the stack trace collector 604, the data collector instrumentation 606, and the data collector 608 are components that may be executed (e.g., by a computing device) in-line with an application that performs part or all of a business transaction as described above. Further, each of the aforementioned components may be part of or executed by one or more agents described above herein. It is to be understood that the aforementioned components may increase an average response time (ART) of corresponding associated business transaction.

Regarding the stack trace collector 604, based on the observations made, traditionally, most important business objects (that comprise information that be considered useful and or valuable to an application operator) are found in parameters or return values close to the exit point instrumentation. This is because data is being packaged or prepared for "leaving" this node to a backend, which includes a database, a queue, a cache, etc.

The stack trace collector 604 may be configured to generate a stack trace associated with one or more business transactions, wherein an application is configured to perform at least part of one or more business transactions (e.g., the application may be an operated on and maintained by an entity like a corporation). The implementation for example, may be as follows:

1. On invocation of every exit point or points of asynchronous hand-off, the agent will capture the stack trace
2. Scanning up to 20 elements per stack trace (configurable), filter out unfavorable classes using a known filter that results in filtered stack trace elements 612, and insert the element to a queue (up to 5 per stack trace) which will be analyzed asynchronously outside the main application thread by the stack trace analyzer. This ensures minimal impact on the response time of the business transaction.

The stack trace collector 604 may be configured to generate a stack trace in response to an event selected from, for example, an invocation of an exit point interceptor of the at least one application and an asynchronous hand-off from the at least one application. Further, by filtering on the application thread into the filtered stack trace elements 612, the techniques herein ensure that a large number of stack traces are not kept; however, a tradeoff here is that the business transaction execution time may increase. The agent may thus be configured to have a rate limit to capture 20 stack traces/10 seconds (configurable) to minimize this overhead. Also the techniques herein may be configured to only capture a stack trace for particular contexts, such as a business transaction.

Notably, an APM call graph filtering configuration may be used by default to filter out certain packages from heuristics and data collection, thereby resulting in the filtered stack trace elements 612. This may filter out a majority of the framework packages. Also, a user can specify which packages should be preferred over others (e.g., in a comma delimited string of package prefixes, such as by configuring app-agent-config.xml, or propagated using a node property). Using this, the techniques herein provide slightly more control to an operator of the application and can score these packages higher.

The stack trace analyzer 610, as shown, is a component which analyzes the method of each stack trace element in the filtered stack trace elements 612 that is collected by the stack trace collector 604. For each element, it assigns a score to each method. This has one main functional component: method scoring and instrumentation. Notably, the stack trace analyzer 610 may identify one or more methods of an application that were invoked during performance of the one or more business transactions using the stack trace. Further, the stack trace analyzer 610 may select, from the identified one or more methods, a set of the one or more methods by applying at least one scoring heuristic to the identified one or methods, as described hereafter.

In more detail with respect to method scoring and instrumentation, in particular, the stack trace analyzer 610 may use a defined heuristic to calculate a score for each method captured by the techniques herein. For instance, an example implementation of this is as follows:

1. Using a scheduled task running every 10 minutes (configurable), drain the queue of elements to a list.
2. Build a map of name of class to actual class. This uses weak reference pointing to array returned by instrumentation.getAllLoadedClasses( ).
3. For each element in the list, run the heuristics and calculate the score.
4. Pick 10 methods (configurable) randomly, using a weighted random algorithm. This is to ensure that even method with lower scores have possibility to be used as collection points.
5. Apply data collector interceptor of the data collector instrumentation 606 at these top 10 methods.

The following are examples of heuristics used to calculate the score for each method. Each method score is a summation of class scores for invoked object, parameters, and return value. Note that interesting types include, among others (e.g., as mentioned above), Enum, Boolean, CharSequence, Number, Date, universally unique identifier (UUID), etc.

---

```
**Calculation heuristic for arbitrary class c and method name mn:
analyze(class c, method name mn):
        if class is annotation | interface | enum | primitive,
        then skip analysis.
        if class is proxy class or generated class, then skip analysis.
        for each declared method dm in c:
                if dm = mn:
                        score = calculate(dm.invoked_object_type) +
                        calculate(dm.parameter[ ]_type) +
                        calculate(dm.return_value_type)
**Calculation heuristic for type t
calculate(type t):
        if t is excluded, then score is 0
        int score = 0
        if t is in whitelist:
                score += 30
        if t is primitive or interesting:
                score += 1
        else if t is array | collection | object:
                score = score // do nothing
        else if t is complex:
                score += calculateComplex(type)
        if t has annotations:
                score += 1
**Complex Calculation heuristic for complex type t
calculateComplex(type t, int score):
        Method[ ] methods = t.getDeclaredMethods
        Field[ ] fields = t.getDeclaredFields
        for each instance field f in fields:
                if f is in whitelist:
                        score += 20
                else if f is primitive or interesting:
                        if f has potentially matching getter:
                                score += 5
                        else:
                                score += 2
        for each instance method m in methods:
                if m is a primitive or interesting getter:
                        score += 1
        repeat calculateComplex for superclass if exists
****
```

---

Thus, for a list of monitored business transactions (or other monitored context), the techniques herein look at methods (and, potentially, associated classes) that were invoked within that business transaction or context when exit calls or exceptions result in stack-traces or generally on entry points. The techniques herein attempt to find and score all methods that would yield the most information if instrumented by using, for example, the above-described heuristics. As such, the techniques herein bias towards methods that have rich "plain old Java objects" (POJOs) or even primitive types and fields. The scores for methods go up (cumulatively) based on whether it has rich POJOs as parameters and return types. The techniques herein also emphasize higher scores for objects designed with private (or public) fields with corresponding getters. These will score many times higher than objects without fields with corresponding getters.

The aforementioned heuristics favor a design pattern where fields have associated getter methods. This is because these field are the most likely to correspond to business objects that are typically of interest for application operators. However, it is contemplated that these heuristics may also favor classes with a large number of fields and methods overall. It is to be understood that the method scoring algorithm is plug-able in the sense that other heuristics may be implemented to calculate a score for a respective method. Notably, the following interface may be defined for method analysis:

---

```
public interface IMethodEvaluationStrategy {
        int evaluateScoreForClass(Class clazz);
}
```

---

Any new strategy will have to implement this logic, define a scoring algorithm for a general class.

For instrumentation of methods and with respect to the data collector instrumentation 606, the techniques herein define the following structure for keeping track of method info and method signature:

---

```
public class MethodInfo {
        private final String className;
        private final String methodName;
}
```

-continued

```
public class MethodSignature {
    private final String className;
    private final String methodName;
    private final String[ ] paramsValueTypes;
    private final String returnValueType;
    private final int score; // Score associated with this method signature.
}
```

Rules can be created using the information above, and the rule will illustratively always be ClassMatchRule, always exactly matching the class name, method name, and exact parameter types. A rule applier 614 may apply, by default, 10 transformation rules with unique class/method names to the data collection instrumentation 606. If there are multiple overloaded versions of the same method name, then this may be considered to be a single rule when imposing a restriction on number of rules to apply. So the actual number of instrumentation points may exceed the default threshold of 10 transformation rules. As retransformation of bytecode imposes overhead, it is not recommended to trigger instrumentation step very often.

The illustrative agent herein applies instrumentation points, for example as the data collection instrumentation 606 as shown in FIG. 6, on the top X (e.g., 10) methods, and upon invocation of the instrumentations points data is collected if the invocation is in a context of a business transaction, the data generated by the data collection instrumentation 606, on the whole or in part, may be gathered as application performance data which the data collector 608 collects. The data format may be designed so that it will be quick to populate the fields for auto configuration of an MIDC. In addition, a flattened structure allows for quick aggregation/analysis on the backend using specific keys, for example, at an Analytics Dynamic Service (ADS) 616. An example proposed data collection format is as follows:

```
public class CollectionData {
    private final String appName; // Name of the application
    private final String appId; // ID of the application
    private final String className; // Name of the class
    private final String methodName; // Name of the method
    private String[ ] parameterTypes; // Name of classes of each parameter
    private final String btName; // Name of the BT
    private final long btId; // ID of the BT
    private final String componentName; // Name of the component (tier)
    private final String componentId; // ID of the component (tier)
    private final String nodeName; // Name of the node
    private final String nodeId; // ID of the node
    private final long eventTimestamp; // When the data was captured, in long
    private List<PrimitiveData> primitiveData; // List of "primitive" data captured by the collector
    private final int score; // Score for the method which applied the instrumentation for this collector
}
public class PrimitiveData {
    private String attributeName; // Name of the attribute (or field)
    private String attributeValue; // Value of the attribute (or field)
    private String dataType; // Data type of the attribute
    private String collectionType; // Collection type of the attribute (invoked_object, param, return_value)
    private String path; // Getter (or field) chain from root object to this attribute. Path begins with collection type value, but specifically for collectionType = param, prepend the param_<index of the parameter>
}
```

As shown above, starting from a root, the techniques herein, via the data collector 610, collect primitive data, only if the type is primitive or interesting. Primitive data may be further collected when a leaf node is identified (e.g., a node in which child nodes will not be discovered).

FIG. 7 illustrates automatic application data collection for potentially insightful business values at an example pseudo code level 700. In particular, for a given method, the techniques herein result in return types and parameter types being filtered down from all types to only those types deemed "interesting" (e.g., illustratively of type CharSequence, String, Number, int, float, double, Boolean, Date, etc.). This "shortlisting" of methods to instrument may start, within a given context (e.g., business transaction), with getting list of classes and their methods: by capturing stack trace at exit call; by capturing a stack trace when exception is thrown; and/or at an entry point. Notably, as shown in associated pseudo code 702, a method may be skipped if it has already been examined or if a class is felted using a call graph filter configuration.

As can be seen in FIG. 7, certain heuristics are then used to score the methods in order to allow sorting the methods and picking the top "X" methods for instrumentation (including their parameters and return types). Notably, with reference to another portion 704 of pseudo code, by visiting the class definitions of a return type, and every parameter type of "this-method", the techniques herein can then, for all classes not filtered using the call graph filter configuration, decide whether to increase the score for interesting types. For instance, it a method type is deemed interesting, its "method-scores" may be incremented by a certain factor (e.g., one). Note that, if the method type is identified as a "complex type", fields of the method can be assessed to determine whether the fields are interesting and the method on the whole may be incremented by another factor (greater than if the method was only identified as interesting, as shown, the factor is five). Prior to checking if a type is 'interesting', an entire class may be checked to determine whether it is whitelisted. If it is whitelisted, a score for an associated method be may be incremented (e.g., by 30). Further, another portion of the pseudo code 706 may determine whether a method has any runtime annotation, which may cause the "method-scores" to be incremented by a certain factor (e.g., one). After scoring all the methods, a final portion of the pseudo code 708 may cause all methods of an application to be scored with a top X of the scored methods being instrumented.

Note that when the instrumented method executes, the following additional rules may be used:
    If type is Map, Collection, or Array, collect one entry
    If 1-d array, capture 'String.valueOf([0])'
    If type is 'CharSequence|String|Number|int|foat|double|boolean|Boolean' collect it
    If "complex type" invoke and capture 'public getXXX' method (apply rules recursively)
    Periodically
        Pick methods at random from the sorted list to get better coverage
        Re-do the analysis for all BTs The techniques herein thus automatically determine valuable data points based on scoring systems, and then instrument the code to understand the context of the application running. By examining the stack trace (e.g., all method calls) and analyzing the stack for content, the techniques herein can rank the methods based on heuristics to determine which portions of code are irrelevant from an insightful monitoring perspective (e.g., logging code, common code, or other code without any perceived business interest). Other code, however, with higher ranks, are perceived to have particular business interest/insight, and can be instrumented accordingly (e.g., changing the byte code and adding instrumentation). This determination (ranking) can be made according to the embodiments herein without the user/customer input, or may be refined through feedback (e.g., selection, refinement, acceptance, and so on), particularly useful for specific application verticals. For instance, a user interface (UI) could be used to allow a user to enter keywords that may be used to scan the code or to otherwise affect the ranking (e.g., when a certain keyword is present, increase (or decrease) the rank value of the method). Also, the techniques herein may either automatically instrument the methods, or may allow a user to view the data selected for monitoring, and then after acceptance by the user, the techniques herein may then configure these data points for full-fledged data collection (or after rejection, what data points/methods to not monitor).

In greater detail of the techniques herein, according to one or more particular embodiments of the present disclosure, a new service, illustratively named AnalyticsDataCollectionService, encompasses three main new components as described with respect to FIG. 6: the stack trace collector 604, the data collector 608, and the stack trace analyzer 610. The AnalyticsDataCollectionService will not be enabled unless user has enabled analytics and has analytics dynamic service installed.

Figure 8:
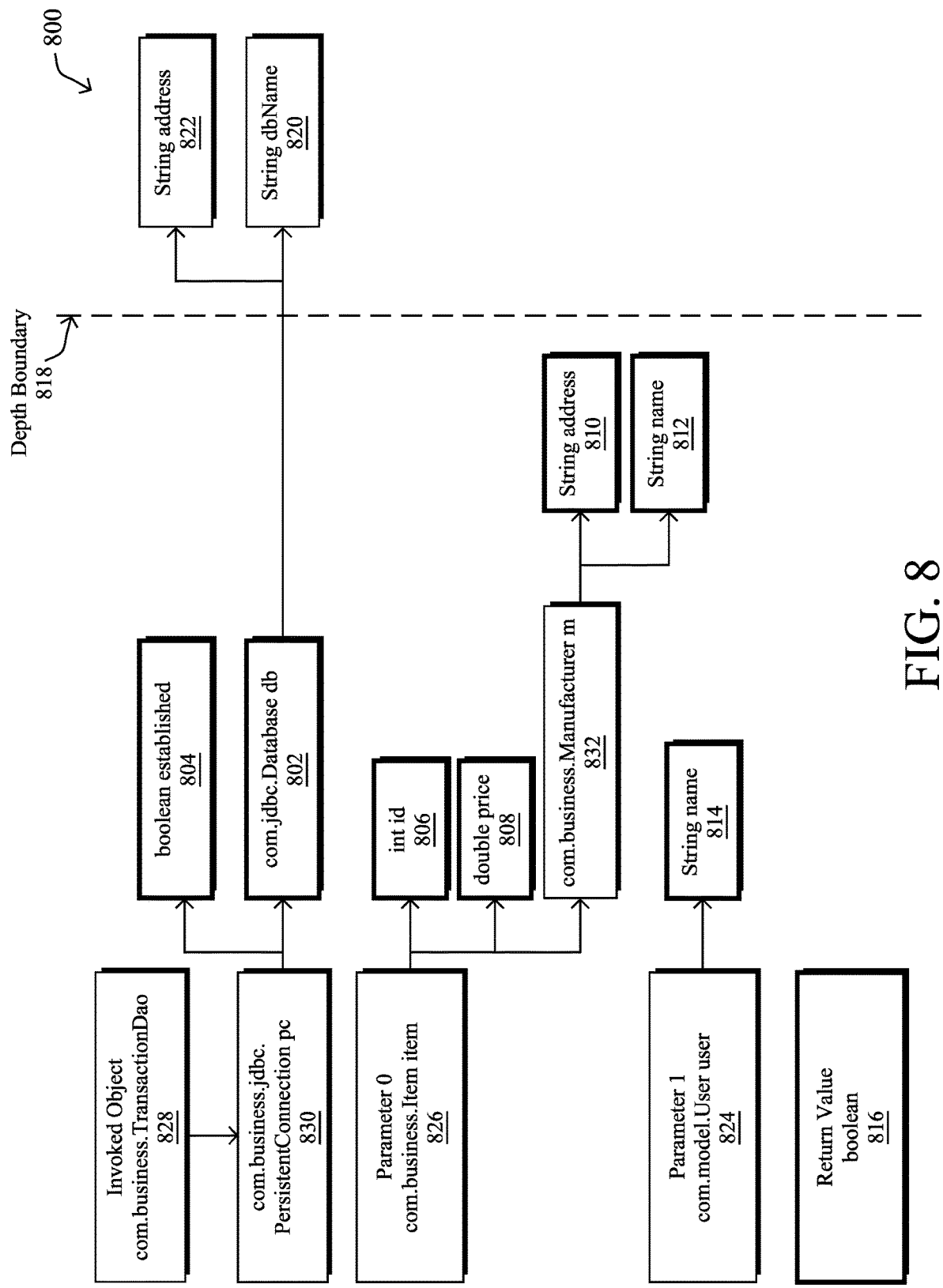
FIG. 8 illustrates an example data list from which a data collector may be configured to collect fields of data.

With more detail regarding the format and type of data collected by the data collector 608, and as shown in FIG. 8, the data collector may be configured to collect certain fields of data of a primitive data list 800, notably leaf nodes 802-816. By default, the data collector may be configured to only collect data that has a depth of 2. It is to be understood that this default may configurable and set to other values. In the case of the depth of 2, the data collector would not collect data beyond a boundary 818, and thus would not collect certain data 820-822.

In case where a leaf node is complex, a value of "Invoked object of <type>" 828-832 may be gathered. If the data type at any node (attribute) is primitive or interesting, for example a "Parameter 1" 824, the data collector may configure instrumentation to collect the filtered string value of the attribute at a leaf node 814. It is to be understood that data is to be collected in the context of a business transaction, as the data may be subject to modification. Accordingly, the data cannot be pushed to a queue for future processing.

In certain embodiments, there may be special edges cases, when the data collector 608 collects primitive data information. For instance, if the data type encountered is an array 826, the data collector may try use the first element of the array instead, and this operation is considered the same depth. For example, for an array of manufacturers and for each item, the data collector may try to use the first manufacturer, then continue to traverse into the array. There are three possible cases for arrays:

```
**Case 1. Complex type, depth not reached - it will continue recursive introspection into
the first element of the array.
        PrimitiveData {
            attributeName='name',
            attributeValue='A***',
            dataType='java.lang.String',
            collectionType='parameter',
            path='param_0.availableItems.[0].name' // Value from first element of the
        array
        }
**Case 2. Complex type, depth reached
        PrimitiveData {
            attributeName='availableItems',
            attributeValue='[Instance of Item, ...]', // Value cannot be shown because it
        is complex
            dataType='com.singularity.ee.service.analytics.midc.collection.Item[ ]',
            collectionType='parameter',
            path='param_0.availableItems'
        }
**Case 3. Primitive/interesting type, and regardless of depth
        PrimitiveData {
            attributeName='availableItems',
            attributeValue='["A**********", ...]', // Value is real value, sanitized
            dataType='java.lang.String[ ]',
            collectionType='parameter',
            path='param_0.availableItems'
        }
```

Notably, if data type extends java.util.Collections, the techniques herein may use the iterator( ) method to fetch one element from the collection, but the data collector may be configured to not "go into" the object further. For example, if the data collector encounters a list of manufacturers for each item, the data collector may try to use the first manufacturer returned using the iterator( ). There are two possible cases for collections:

```
**Case 1. Complex type, regardless of depth
        PrimitiveData {
            attributeName='manufacturers',
            attributeValue='[Instance of Manufacturer, ...]',
            // Value cannot be shown
        because it is complex
            dataType='java.util.List',
            collectionType='parameter',
            path='param_0.manufacturers'
        }
**Case 2. Primitive/interesting type, regardless of depth
        PrimitiveData {
            attributeName='manufacturers',
            attributeValue='["A*******", ...]',
            // Value from collection, fetched using
        iterator.next( )
            dataType='java.util.List',
            collectionType='parameter',
            path='param_0.manufacturers'
        }
```

If an encountered data type extends or implements a java.util.Map, the data collector 608 may need to use the keySet( ) method to fetch one key from the map, and try attempt to use a get( ) method to fetch the value. The data collector need not go into key or value further. For example, if the data collector encounters have a map of manufacturers for each item to number of items, the data collector will get one key using keySet( ) method, then get the value for the key. There are four possible cases for when the data collector may encounter a map type:

```
**Case 1. Complex key type, complex value type, regardless of depth:
    PrimitiveData {
        attributeName='itemToManufacturer',
        attributeValue='[{Instance of Item=Instance of Manufacturer}, ...]', //
    mapping of item to manufacturer
        dataType='java.util.Map',
        collectionType='parameter',
        path='param_0.itemToCount'
    }
**Case 2. Complex key type, primitive/interesting value type, regardless of depth:
    PrimitiveData {
        attributeName='itemToManufacturer',
        attributeValue='[{Instance of Item="A*****"}, ...]', // mapping of item to
    manufacturer name (string)
        dataType='java.util.Map',
        collectionType='parameter',
        path='param_0.itemToCount'
    }
**Case 3. Primitive/interesting key type, complex value type, regardless of depth:
    PrimitiveData {
        attributeName='itemToManufacturer',
        attributeValue='[{"A*****"=Instance of Manufacturer}, ...]', // mapping
    of item name (string) to manufacturer
        dataType='java.util.Map',
        collectionType='parameter',
        path='param_0.itemToCount'
    }
**Case 4. Primitive/interesting key type, primitive/interesting value type, regardless of
depth:
    PrimitiveData {
        attributeName='itemToManufacturer',
        attributeValue='[{"A*****"="A*****"}, ...]', // mapping of item name
    (string) to manufacturer name
        (string)
        dataType='java.util.Map',
        collectionType='parameter',
        path='param_0.itemToCount'
    }
```

Regarding an "Invocation Rate Limit," it is possible that the method is invoked constantly, so the data collector 608 may need to rate limit the data collection frequency. For this, an agent may include an interceptor illustratively named AFastTrackedRateLimitMethodInterceptor, which will not execute onMethodBeginTracked and onMethodEndTracked if the rate limit is hit. Each interception point has assigned unique transformation identifier (ID). Using this unique ID, it is possible to ascertain how often a method is invoked using map data structure persistent in the interceptor. The data collector 608 limit the number of times an interceptor with associated transformation ID could execute data collection.

One example implementation for rate limit is as follows:
Check if current transformation ID has number of invocations less than maximum number of invocations. If zero, add the new mapping of element to invocation of 1 to the map.
If so, then increment the number of invocations, and gather data. If not, do not gather data.
A scheduled reaper task removes the first an element from this map in a round-robin fashion every 10 seconds.

Resetting limit for each transformation ID one at a time ensures that the data collector 608 does not have surge of data collection when the map is cleared.

Additionally, there may be risks with data collection, such as security concerns. In particular, enough data needs to be collected to provide useful insight; while taking into account the amount of data collected as well as the nature of data collected. For that, the data collector 608 may filter the actual data gathered, as in masking of the values. That is, due to privacy concerns, data may need to be filtered upon collection. Notably, privacy filters may be applied by the data collector to the instrumentation of the one or more instrumentation points. The data collector may collect a String value of each object, and if the object is null then the data collector may simply collect a String value of null. Generally, all characters may be sanitized to 'A' or 'a' based on case, and all digits sanitized to '0'. All other characters are sanitized to "3". For example:

If value is boolean type, or "true" or "false", show "aaaaaa".
Designated special characters (e.g., a dash '-', a period '.', a comma ',', an '@' symbol, or any other user customizable list of characters) will be converted to '#' (TBD). Alternatively, these special characters may be unsanitized by default.

This may be accomplished without use of regex, as pattern matching may be expensive. The approach here is to go through the entire string and apply a filter on each character until all characters are processed. Character.isWhiteSpace (char) API can handle unicode white spaces (have verified). A node property will allow users to configure additional designated characters.

Figure 9:
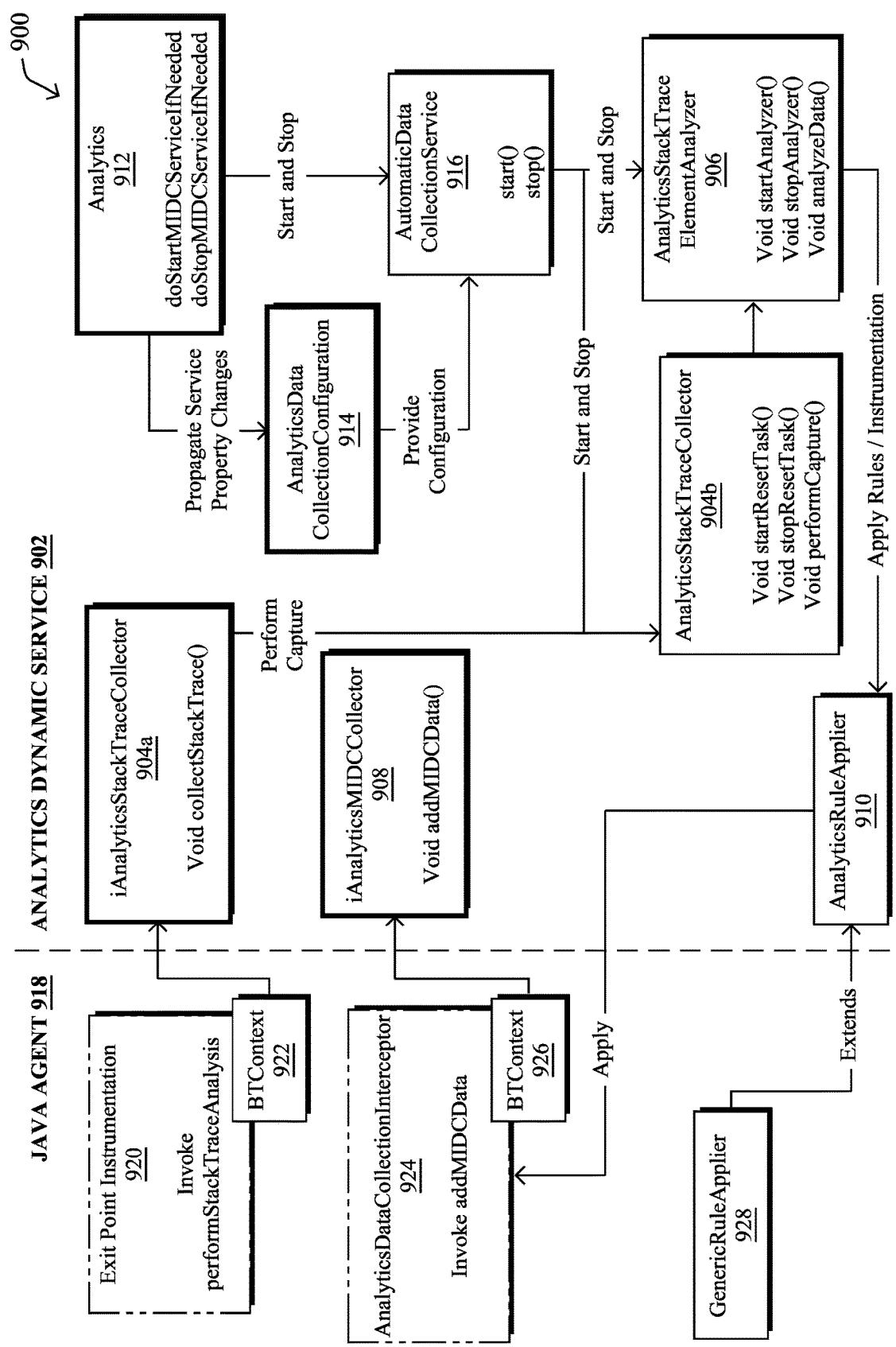
FIG. 9 illustrates an example proposed integration of automatic application data collection for potentially insightful business values with an Analytics Dynamic Service (ADS)

Turning now to FIG. 9, an example proposed integration 900 of automatic application data collection for potentially insightful business values with an Analytics Dynamics Service (ADS) is shown. As shown, most of the automatic application data collection code will reside in an ADS 902, where the ADS 902 comprises a stack trace collector (shown as an "iAnalyticsStackStackTraceCollector" 904a and a "AnalyticsStackTraceCollector" 904b), a stack track trace analyzer 906, a MIDC collector 908, and a rule applier 910, as described herein. Further, the ADS 902 may comprise analytics agents 912 as well as a collection configuration 914 and associated control methods 916 to enable/disable the automatic application data collection. Specifically, scheduled tasks such as reset task, analyzer, etc. using the callback on the AnalyticsMIDCConfigListener can be started or stopped based on the collection configuration 914 and associated control methods 916. In addition, a listener can be used to propagate service property changes to the automatic application data collection to modify a collection configuration.

As shown, a portion of the automatic application data collection code will reside in a java (or monitoring) agent 918 that resides in, for example, application code (of an application operator). Within the java agent 918, there may be included exit point instrumentation 920 that generates data, shown as a BT context 922, in response to the exit point instrumentation 920 invoking a stack track analysis (and eventually analyzed by the stack trace analyzer 906). The java agent 918, may also include a data collection interceptor 924 that comprises instrumentation that generates instrumentation data as BT context 926. The data collection interceptor 924 may be inserted into the java agent 918 in accordance with the techniques described herein (for instance, after being identified according to certain heuristics). As is understood by the above description, the BT context 926 may be used by individuals with the operator of the application to gain insight into the application. Additionally, the java agent 918 may include its own rule applier 928 that is specific to the java agent 918.

It is to be understood that performance and overhead considerations are also important. Since arbitrary data collection poses a non-trivial overhead on the agent (e.g., of the agents shown in FIG. 9), here are some considerations that can be made:

- Agents, in an embodiment, are to be configured to do minimal processing in-line with the BT execution. As previously stated, any additional execution done in-line with BT execution, typically leads to an increase in ART of the BT. It is possible that agent may incur significant overhead as each method in the stack have data collector applied.
- Agents need to limit the amount of data collection in case the amount of data imposes high overhead. This overhead increases with complexity of data collected, as well as the collection depth.

The most significant impact on performance will be on the ART of the running business transaction during stack trace collection prior to instrumentation and data collection after instrumentation. The severity of is relative to the nature of the application, including, for example:

Number of exit points within a single BT;
Length of stack trace upon capture on the BT;
Complexity of invoked object, parameter values, and return value; and
Depth of object tree till leaf (no more child fields).

Rate of data collection can be changed via the limits to allow for higher data collection rate. The rate can also vary depending on the nature of the application, such as:

Number of times instrumentation point has hit;
Complexity of invoked object, parameter values, and return value; and/or
Depth of object tree till leaf (no more child fields).

Using the following assumptions:

class name is 64 characters long;
method name is 32 characters long;
Three parameters, class names each is 64 characters long;
BT name is 32 characters long;
BT ID is 4 characters long;
Event time stamp is 13 characters long;
There are 10 primitive data objects;
Each primitive data has attribute name, attribute value, data type, each 32 characters long;
Each primitive data has collection type invoked_object (14 characters long); and
Each primitive data has path 64 characters long:

then the size of this JSON string minified will be around 3 kB.

The techniques herein use the following calculation to calculate the rate of data collection:

$$\text{data\_collection\_for\_some\_interval\_on\_instrumentation} = \\ (\text{size\_of\_json} * \text{maximum\_per\_instrumentation}) * \\ (\text{num\_methods} + \\ \text{interval\_in\_seconds\_per\_instrumentation\_reset} / \\ \text{rotation\_interval\_is\_seconds})$$

Using default values, using an interval of 10 minutes, this can be calculated to ~630 kilobytes, per 10 minutes. So on an hourly basis, this will be ~3780 kilobytes=3.78 mebabytes. Assume this will linearly increase with number of agents. Assuming there are 20 primitive data objects, the collection rate increases to ~6.93 megabytes per hour, at 1155 kilobytes per data collection, per agent. This is an assumption on the worst case scenario, where all the class, method, and field names and values are very long.

The below are some of the limits the techniques herein can have in place in the agent:

Number of stack traces captured overall per interval, with default of 20 stack trace/10 seconds, configurable;
Number of elements in each stack trace scanned per interval, with default of 20 elements/stack trace, configurable;
Number of elements to keep and analyze per stack trace, with default of 5 elements/stack trace, configurable;
Maximum of stack trace elements to queue per interval, with default of 500 elements/10 minutes, configurable;
Number of methods to be instrumented and from which data is to be collected, with default of 10 methods/10 minutes;
Maximum depth of data collection, with default of 2, configurable;
Number of times of data collection per method per interval, default of 3, configurable; and
Rotation interval, rate at which the limited instrumentation is allowed for data collection again, every 10 seconds.

Thus, when configuring one or more monitoring agents executing on an application to instrument the selected set of the one or methods at one or more instrumentation points, a reporting rate of the instrumentation may be configured for the one or more instrumentation points based on factor selected from the group consisting of a frequency of invocation for the instrumentation, a complexity level of an object associated with the instrumentation, and a depth of data collected by the instrumentation.

Furthermore, additional node properties to allow configuration for finer tuning for specific environments, through customization or customer feedback of the instrumentation may be configured for the one or more instrumentation points, with regard to customer use case have been defined herein:

analytics.collection.feature.enabled :: Hard toggle to enables or disable the auto data collection service on the analytics dynamics service. This can be used in cases where this feature is not desired to be operable even if controller flag is enabled (essentially an agent-side feature flag).

analytics-collection-stack-traces-collected :: Number of stack traces collected per interval (interval defined in a different property), default 20.

analytics-collection-stack-trace-collection-reset-interval :: Interval (in seconds) to reset stack trace collection limit, default 10.

analytics-collection-elements-scan-per-stack-trace :: Number of elements to scan per stack trace before stopping, default 20.

analytics-collection-elements-retain-per-stack-trace :: Number of elements to retain (collect) per stack trace before stopping, default 5.

analytics-collection-package-prefix :: Comma-delimited list of package prefixes to white list from analysis/data capture filtering, default Not configured.

analytics-element-analysis-interval :: Interval (in seconds) for triggering element analysis, default 600.

analytics-method-instrumentation :: Number of methods (unique class name/method name combinations) to instrument with data collection instrumentation. Overloaded variants are considered the same for this limit. Default 10.

analytics-maximum-num-rules-multiplier :: Multiplier used to impose absolute ceiling on number of individual rules to apply instrumentation. i.e. There are more than 100 overloaded versions of class foo and method bar, so after 100 a limit may be hit. Calculation: analytics-method-instrumentation*analytics-maximum-num-rules-multiplier. Default 10.

analytics-instrumentation-suppression :: Number of times collection instrumentation will be invoked and processed until suppression comes into effect. If a method with instrumentation is called 4 times, the last time it won't collect data. Default 3.

analytics-runtime-introspection-depth :: The level of depth in the object tree that will be visited until the function stops looking deeper into the object tree (e.g., with a depth limit of 2, then starting from root object the function goes in twice (from root w, visit field x inside w, and visit field y inside x)). Default 2.

analytics-runtime-attribute-value-length :: Maximum length of String value of attribute that is to be collected (32)

analytics-collection-reap-interval :: Interval (in seconds) to remove one suppressed collection instrumentation point, so that the function can gather data from that point again. This works in such a way it removes the oldest suppressed point first. Default 10.

analytics-collection-special-characters :: used to define additional characters which should be whitelisted in an attribute value (as described with respect to designated special characters above). Default is enabled.

Additionally, according to one or more aspects of the techniques described herein, the following new metrics may be gathered to capture potential overhead (i.e., three new metrics as part of surfacing overhead on agent are captured):

1. Analytics Stack Trace Capture Time :: Time taken to capture and queue up stack trace for processing in the future, for a single stack trace capture call. This may be measured in microseconds. Note: Within a single BT call, multiple stack traces can be captured, so the actual overhead on one BT not be equal to the metric value. For example, assume a BT makes two method calls which are both considered exit points. The time shown on the metric browser will be an average of time taken to capture stack trace (e.g., in sendDatabaseCall and processPayment).

2. Analytics Method Evaluation Time :: Time taken to complete method analysis on all stack traces captured in the last analysis window (default of 10 minute), and trigger instrumentation. This may be measured in microseconds.

3. Analytics Data Collection Time :: Time taken to capture data from for all instrumented method calls, for a *single* invocation of the instrumentation. This may be measured in microseconds. Note: Within a single BT call, multiple methods may be instrumented; therefore, this metric value may vary depending on the BT. For example, assume a BT makes two method calls which are both considered exit points. The time shown on the metric browser will be a average of time taken to capture data for two methods (e.g., sendDatabaseCall and processPayment).

According to one or more embodiments herein, the techniques may be implemented on either an agent or within the ADS In particular, a consideration may be that majority of the code to collect stack trace, analyze the stack trace would live on the ADS (analytics dynamic service), while the interceptor and rule applier lives on the agent. This is because without the ADS, the analysis is unnecessary. If the techniques herein (the "services") are configured in the Agent, then the service has access to all the necessary functionalities of the agent, and the only contract between the agent and ADS would be for data transfer. However, there is no easy way of determining if ADS is installed in this implementation. Alternatively, if the service lives in the ADS, then the service will only be alive if ADS is enabled along with agent and data collection logic resides within the ADS, which is a more modular approach. However, now some code would have to live on the agent, and more contracts would need to be defined including passing around method data (instrumentation of top methods). The choice is configurable and implementation specific, and the techniques herein are not limited to one or the other.

Figure 10:
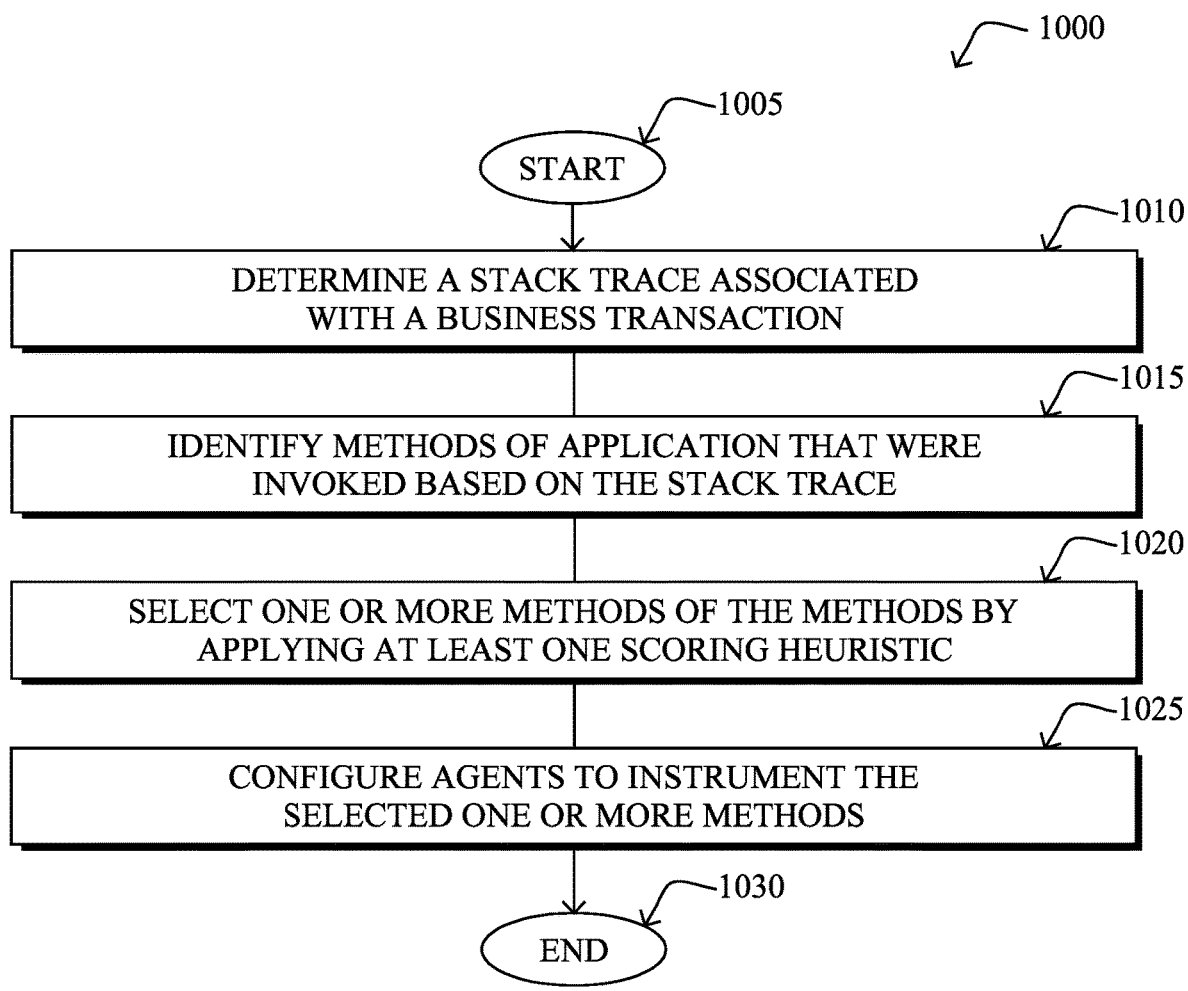
FIG. 10 illustrates an example procedure automatic application data collection for potentially insightful business values in accordance with one or more embodiments described herein.

In closing, FIG. 10 illustrates an example simplified procedure for automatic application data collection for potentially insightful business values in accordance with one or more embodiments described herein, particularly from the perspective of, for example, a stack analyzer. For example, a non-generic, specifically configured device (e.g., device 200, particularly a monitoring device) may perform procedure 1000 by executing stored instructions (e.g., process 248, such as a monitoring process). The procedure 1000 may start at step 1005, and continues to step 1010, where, as described in greater detail above, process may determine a stack trace associated with a business transaction. In particular, the process may determine a stack trace associated with one or more business transactions, wherein at least one application is configured to perform at least part of the one or more business transactions. The stack trace may be generated in response to an event selected from the group consisting of an invocation of an exit point interceptor of the at least one application and an asynchronous hand-off from the at least one application.

At step 1015, the process may identify methods of an application that were invoked using the stack trace. In particular, the process may identify, based on the stack trace, one or more methods of the at least one application that were invoked during performance of the one or more business transactions. Identifying the one or more methods may comprise identifying, by the process, classes associated with the one or more methods, wherein the set of the one or more methods is further selected based on the classes associated with the one or more methods.

At step 1020, the process may select one or more methods of the methods by applying at least one scoring heuristic. In particular, the process may select, from the identified one or more methods, a set of the one or more methods by applying at least one scoring heuristic to the identified one or methods. Selecting the set of the one or more methods may comprise: generating, by the process, a score for each of the identified one or more methods; and selecting, by the process, the set of the one or more methods using scores generated for the one or more methods. Generating the score for each of the identified one or more methods may be based on at least one factor selected from the group consisting of a number of Plain Old Java Objects (POJOs) as parameters in an identified method, a number of POJOs as return types in the identified method, a number of primitive types in the identified method, and a number of primitive fields in the identified method. Generating the score for each of the identified one or more methods may be based on a number of private fields or a number of public fields in an identified method.

At step 1025, the process may configure agents to instrument the selected one or more methods. In particular, the process may configure one or more monitoring agents executing on the at least one application to instrument the selected set of the one or methods at one or more instrumentation points, wherein application performance data is generated by instrumentation of the one or more instrumentation points. Configuring the one or more monitoring agents may comprise applying, by the process, privacy filters to the instrumentation of the one or more instrumentation points. Configuring the one or more monitoring agents may comprise configuring, by the process, a reporting rate of the instrumentation of the one or more instrumentation points based on factor selected from the group consisting of a frequency of invocation for the instrumentation, a complexity level of an object associated with the instrumentation, and a depth of data collected by the instrumentation.

The simplified procedure 1000 may then end in step 1030, notably with the ability to continue monitoring an application through the instrumentation. Other steps may also be included generally within procedure 1000. For example, such steps (or, more generally, such additions to steps already specifically illustrated above), may include: receiving, by the process, data indicative of the stack trace from the one or more monitoring agents. Further, such steps may include: collecting, by the process and from the one or more monitoring agents, the application performance data that is generated by the instrumentation of the one or more instrumentation points; and causing, by the process, presentation of the application performance data in a display.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for automatic application data collection for potentially insightful business values. In particular, the techniques herein automatically surface useful business data by automatically selecting interesting instrumentation points, and automatically gathering objects related to these instrumentation points. That is, the techniques herein make it easy for the customer to create MID/HTTP collectors by introspecting the application's code and suggesting areas that the user may want to get more visibility into. Also, the techniques herein run in production, meaning apart from most crucial context-required operations, most of the execution is offloaded to an agent thread (i.e., with minimal impact to business functionality/logic and overhead). Further, periodic re-collection of the insightful data can occur, based on various factors and at various intervals, such as on-demand, on a schedule, when new heuristics are defined, and so on. Moreover, the techniques herein are not merely finding un-instrumented data within a code, but are discovering (e.g., and ranking) valuable business data points for instrumentation.

In still further embodiments of the techniques herein, a business impact of the application data collected can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the application data collected with various business transactions in order to better understand the effect on the business transactions, accordingly.

Illustratively, the techniques described herein may be performed by hardware, software, and/or firmware, such as in accordance with the illustrative automatic application data collection process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

According to the embodiments herein, a method herein may comprise: determining, by a process, a stack trace associated with one or more business transactions, wherein at least one application is configured to perform at least part of the one or more business transactions; identifying, by the process and based on the stack trace, one or more methods of the at least one application that were invoked during performance of the one or more business transactions; selecting, by the process and from the identified one or more methods, a set of the one or more methods by applying at least one scoring heuristic to the identified one or methods; and configuring, by the process, one or more monitoring agents executing on the at least one application to instrument the selected set of the one or methods at one or more instrumentation points, wherein application performance data is generated by instrumentation of the one or more instrumentation points.

In one embodiment, the stack trace may be generated in response to an event selected from the group consisting of an invocation of an exit point interceptor of the at least one application and an asynchronous hand-off from the at least one application.

In one embodiment, the method may further comprise: receiving, by the process, data indicative of the stack trace from the one or more monitoring agents.

In one embodiment, identifying, by the process and based on the stack trace, the one or more methods of the at least one application may comprise: identifying, by the process, classes associated with the one or more methods, wherein the set of the one or more methods is further selected based on the classes associated with the one or more methods.

In one embodiment, selecting, by the process and from the identified one or more methods, the set of the one or more methods by applying the at least one scoring heuristic to the identified one or methods may comprise: generating, by the process, a score for each of the identified one or more methods; and selecting, by the process, the set of the one or more methods using scores generated for the one or more methods.

In one embodiment, generating, by the process, the score for each of the identified one or more methods may be based on at least one factor selected from the group consisting of a number of Plain Old Java Objects (POJOs) as parameters in an identified method, a number of POJOs as return types in the identified method, a number of primitive types in the identified method, and a number of primitive fields in the identified method.

In one embodiment, generating, by the process, the score for each of the identified one or more methods may be based on a number of private fields or a number of public fields in an identified method.

In one embodiment, configuring, by the process, the one or more monitoring agents executing on the at least one application to instrument the selected set of the one or methods at one or more instrumentation points may comprise: applying, by the process, privacy filters to the instrumentation of the one or more instrumentation points.

In one embodiment, configuring, by the process, the one or more monitoring agents executing on the at least one application to instrument the selected set of the one or methods at one or more instrumentation points may comprise configuring, by the process, a reporting rate of the instrumentation of the one or more instrumentation points based on factor selected from the group consisting of a frequency of invocation for the instrumentation, a complexity level of an object associated with the instrumentation, and a depth of data collected by the instrumentation.

In one embodiment, the method may further comprise: collecting, by the process and from the one or more monitoring agents, the application performance data that is generated by the instrumentation of the one or more instrumentation points; and causing, by the process, presentation of the application performance data in a display.

According to the embodiments herein an apparatus herein may comprise: one or more network interfaces to communicate with a network; a processor coupled to the network interfaces and configured to execute one or more processes; and a memory configured to store a process executable by the processor, the process, when executed, configured to: determine a stack trace associated with one or more business transactions, wherein at least one application is configured to perform at least part of the one or more business transactions; identify, based on the stack trace, one or more methods of the at least one application that were invoked during performance of the one or more business transactions; select, from the identified one or more methods, a set of the one or more methods by applying at least one scoring heuristic to the identified one or methods; and configure one or more monitoring agents executing on the at least one application to instrument the selected set of the one or methods at one or more instrumentation points, wherein application performance data is generated by instrumentation of the one or more instrumentation points.

Further, according to the embodiments herein, a tangible, non-transitory, computer-readable medium herein may have computer-executable instructions stored thereon that, when executed by a processor on a computer, may cause the computer to perform a method comprising: determining a stack trace associated with one or more business transactions, wherein at least one application is configured to perform at least part of the one or more business transactions; identifying, based on the stack trace, one or more methods of the at least one application that were invoked during performance of the one or more business transactions; selecting, from the identified one or more methods, a set of the one or more methods by applying at least one scoring heuristic to the identified one or methods; and configuring one or more monitoring agents executing on the at least one application to instrument the selected set of the one or methods at one or more instrumentation points, wherein application performance data is generated by instrumentation of the one or more instrumentation points.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   determining, by a computing device executing an analytics dynamic service (ADS) that is in-line with at least one application, a stack trace by instantiating a stack trace collector code module which when executed is configured to generate the stack trace based on one or more business transactions, wherein the at least one application is configured to perform at least part of the one or more business transactions, and wherein the at least one application comprises one or more monitoring agents residing in application code of the at least one application;
   performing, by the computing device, an analysis of the stack trace by instantiating a stack trace analyzer code module which when executed is configured to analyze elements of the stack trace;
   identifying, by the computing device and based on the analysis of the stack trace, one or more methods of the at least one application that were invoked during performance of the one or more business transactions;
   generating, by the computing device, scores for each of the identified one or more methods based on which fields or parameters are used in an identified method;
   selecting, by the computing device and from the identified one or more methods, a set of the one or more methods based on the scores generated for each of the identified one or more methods; and
   configuring, by the computing device, the one or more monitoring agents executing on the at least one application to instrument the selected set of the one or more methods at one or more instrumentation points by instantiating an exit point instrumentation code module which when executed is configured to generate application performance data in response to instrumentation of the one or more instrumentation points, wherein the one or more monitoring agents set a reporting rate of the instrumentation of the one or more instrumentation points based on a complexity level of an object associated with the instrumentation and a depth of data collected by the instrumentation so that a measured overhead of the instrumentation is minimized.

2. The method as in claim 1, wherein the stack trace is generated in response to an event selected from the group consisting of an invocation of an exit point interceptor of the at least one application and an asynchronous hand-off from the at least one application.

3. The method as in claim 1, further comprising:
   receiving, by the computing device, data indicative of the stack trace from the one or more monitoring agents.

4. The method as in claim 1, wherein identifying, by the computing device and based on the stack trace, the one or more methods of the at least one application comprises:
   identifying, by the computing device, classes associated with the one or more methods, wherein the set of the one or more methods is further selected based on the classes associated with the one or more methods.

5. The method as in claim 1, wherein configuring, by the computing device, the one or more monitoring agents executing on the at least one application to instrument the selected set of the one or methods at one or more instrumentation points comprises:
   applying, by the computing device, privacy filters to the instrumentation of the one or more instrumentation points.

6. The method as in claim 1, wherein the reporting rate is further based on a frequency of invocation for the instrumentation.

7. The method as in claim 6, further comprising:
   collecting, by the computing device and from the one or more monitoring agents, the application performance data that is generated by the instrumentation of the one or more instrumentation points; and
   causing, by the computing device, presentation of the application performance data in a display.

8. The method as in claim 1, wherein instantiating of the stack trace collector code module, the stack trace analyzer code module, and exit point instrumentation code module is coordinated between the ADS and the one or more monitoring agents.

9. The method as in claim 1, wherein the measured overhead of the instrumentation is measured using one or more of a analytics stack trace capture time, an analytics method evaluation time, or a analytics data collection time.

10. An apparatus, comprising:
    one or more network interfaces to communicate with a network;
    a processor coupled to the network interfaces and configured to execute one or more processes; and
    a memory configured to store a process executable by the processor, the process, when executed, configured to:
       determine a stack trace by instantiating a stack trace collector code module which when executed is configured to generate the stack trace based on one or more business transactions, wherein at least one application is configured to perform at least part of the one or more business transactions, wherein the apparatus comprises a computing device in a computer network that executes an analytics dynamic service (ADS) in-line with the at least one application, and wherein the at least one application comprises one or more monitoring agents residing in application code of the at least one application;

perform an analysis of the stack trace by instantiating a stack trace analyzer code module which when executed is configured to analyze elements of the stack trace;

identify, based on the analysis of the stack trace, one or more methods of the at least one application that were invoked during performance of the one or more business transactions;

generate scores for each of the identified one or more methods based on which fields or parameters are used in an identified method;

select, from the identified one or more methods, a set of the one or more methods based on the scores generated for each of the identified one or more methods; and configure the one or more monitoring agents executing on the at least one application to instrument the selected set of the one or more methods at one or more instrumentation points by instantiating an exit point instrumentation code module which when executed is configured to generate application performance data in response to instrumentation of the one or more instrumentation points, wherein the one or more monitoring agents set a reporting rate of the instrumentation of the one or more instrumentation points based on a complexity level of an object associated with the instrumentation and a depth of data collected by the instrumentation so that a measured overhead of the instrumentation is minimized.

11. The apparatus as in claim 10, wherein the stack trace is generated in response to an event selected from the group consisting of an invocation of an exit point interceptor of the at least one application and an asynchronous hand-off from the at least one application.

12. The apparatus as in claim 10, wherein the process, when executed, is further configured to:
receive data indicative of the stack trace from the one or more monitoring agents.

13. The apparatus as in claim 10, wherein to identify, based on the stack trace, the one or more methods of the at least one application comprises:
identifying classes associated with the one or more methods, wherein the set of the one or more methods is further selected based on the classes associated with the one or more methods.

14. The apparatus as in claim 10, wherein to configure the one or more monitoring agents executing on the at least one application to instrument the selected set of the one or methods at one or more instrumentation points comprises:
applying privacy filters to the instrumentation of the one or more instrumentation points.

15. The apparatus as in claim 10, wherein the reporting rate is further based on a frequency of invocation for the instrumentation.

16. The apparatus as in claim 10, wherein instantiating of the stack trace collector code module, the stack trace analyzer code module, and exit point instrumentation code module is coordinated between the ADS and the one or more monitoring agents.

17. The apparatus as in claim 10, wherein the measured overhead of the instrumentation is measured using one or more of a analytics stack trace capture time, an analytics method evaluation time, or a analytics data collection time.

18. A tangible, non-transitory, computer-readable medium having computer-executable instructions stored thereon that, when executed by a processor on a computing device in a computer network, cause the computer to perform a method comprising:

determining a stack trace by instantiating a stack trace collector code module which when executed is configured to generate the stack trace based on one or more business transactions, wherein at least one application is configured to perform at least part of the one or more business transactions, wherein the computing device executes an analytics dynamic service (ADS) in-line with the at least one application, and wherein the at least one application comprises one or more monitoring agents residing in application code of the at least one application;

performing an analysis of the stack trace by instantiating a stack trace analyzer code module which when executed is configured to analyze elements of the stack trace;

identifying, based on the analysis of the stack trace, one or more methods of the at least one application that were invoked during performance of the one or more business transactions;

generating scores for each of the identified one or more methods based on which fields or parameters are used in an identified method;

selecting, from the identified one or more methods, a set of the one or more methods based on the scores generated for each of the identified one or more methods; and configuring the one or more monitoring agents executing on the at least one application to instrument the selected set of the one or more methods at one or more instrumentation points by instantiating an exit point instrumentation code module which when executed is configured to generate application performance data in response to instrumentation of the one or more instrumentation points, wherein the one or more monitoring agents set a reporting rate of the instrumentation of the one or more instrumentation points based on a complexity level of an object associated with the instrumentation and a depth of data collected by the instrumentation so that a measured overhead of the instrumentation is minimized.

19. The tangible, non-transitory, computer-readable medium as in claim 18, wherein instantiating of the stack trace collector code module, the stack trace analyzer code module, and exit point instrumentation code module is coordinated between the ADS and the one or more monitoring agents.

20. The tangible, non-transitory, computer-readable medium as in claim 18, wherein the measured overhead of the instrumentation is measured using one or more of a analytics stack trace capture time, an analytics method evaluation time, or a analytics data collection time.

* * * * *